(12) United States Patent
He

(10) Patent No.: US 7,149,215 B1
(45) Date of Patent: Dec. 12, 2006

(54) TECHNIQUE FOR MULTICASTING RECEIVER MEMBERSHIP REPORTS

(75) Inventor: Haixiang He, Woburn, MA (US)

(73) Assignee: Nortel Networks Limited, St. Laurent (CA)

( * ) Notice: Subject to any disclaimer, the term of this patent is extended or adjusted under 35 U.S.C. 154(b) by 947 days.

(21) Appl. No.: 10/077,763

(22) Filed: Feb. 20, 2002

(51) Int. Cl.
*H04L 12/56* (2006.01)
*H04J 3/26* (2006.01)

(52) U.S. Cl. .................. 370/390; 370/270; 370/432

(58) Field of Classification Search .............. None
See application file for complete search history.

(56) References Cited

U.S. PATENT DOCUMENTS

| | | | |
|---|---|---|---|
| 6,614,787 B1* | 9/2003 | Jain et al. | 370/390 |
| 6,839,348 B1* | 1/2005 | Tang et al. | 370/390 |
| 2002/0196802 A1* | 12/2002 | Sakov et al. | 370/432 |
| 2003/0012194 A1* | 1/2003 | Novaes | 370/390 |

\* cited by examiner

*Primary Examiner*—Chi Pham
*Assistant Examiner*—Justin M. Philpott
(74) *Attorney, Agent, or Firm*—Hunton & Williams, LLP

(57) ABSTRACT

A technique for distributing receiver membership reports containing receiver information for a plurality of multicast source systems in a multicast source notification of interest protocol is disclosed. In one embodiment, the technique is realized by collecting receiver information for a plurality of multicast source systems; aggregating receiver information for each multicast source system into a respective record; indexing each respective record using an IP address of each multicast source system; aggregating the plurality of respective records into a single message; and multicasting the single message to a group address.

16 Claims, 2 Drawing Sheets

TECHNIQUE FOR MULTICASTING RECEIVER MEMBERSHIP REPORTS

FIELD OF THE INVENTION

The present invention relates generally to distributing receiver membership reports and, more particularly, to a technique for distributing receiver membership reports containing receiver information for a plurality of multicast source systems in a Multicast Source Notification of Interest Protocol (MSNIP) environment.

BACKGROUND OF THE INVENTION

Multicast Source Notification of Interest Protocol (MSNIP) is designed to enable multicast sources to avoid sending packets when there are no receivers. This function may be especially important for a server that sources a large number of multicast flows. Deploying this function efficiently saves resources of a multicast source system and further improves bandwidth usage of a first-hop link.

Usually, a first hop router to a source maintains receiver information through a multicast routing protocol. MSNIP may be used in the first-hop link to handle communication of receiver information between a multicast source system and a first hop router.

MSNIP may support at least three types of messages, such as a Group Map message, an Interest Solicitation message and a Receiver Report message. The first hop router may periodically send a Group Map message to advertise group ranges over which MSNIP may operate. The first hop router may multicast this message to a group address, such as an ALLSYSTEMS group. A host that wishes to be managed by MSNIP may periodically send an Interest Solicitation message. The host may multicast this message to an ALL_IGMPv3_ROUTERS group address, for example, 224.0.0.22. The first hop router may send a plurality of Receiver Membership Report messages to a plurality of multicast source systems for communicating receiver information maintained by a multicast routing protocol. The router unicasts this message to each multicast source system individually.

When there is more than one multicast source in a network, a first hop router generally needs to unicast receiver information to each multicast source separately. This results in a large number of unicast messages in a first hop network, especially where one router supports many multicast sources. Thus, current systems are inefficient.

In view of the foregoing, it would be desirable to provide a technique for distributing receiver membership reports from a first hop router to a multicast source system in a Multicast Source Notification of Interest Protocol environment which overcomes the above-described inadequacies and shortcomings. More particularly, it would be desirable to provide a technique for distributing receiver membership reports in an efficient and cost effective manner.

SUMMARY OF THE INVENTION

According to the present invention, a technique for distributing receiver membership reports containing receiver information for a plurality of multicast source systems in a Multicast Source Notification of Interest Protocol environment is provided. In one exemplary embodiment, a method for multicasting a plurality of receiver membership reports containing receiver information for a plurality of multicast source systems comprises the steps of: collecting receiver information for the plurality of multicast source systems; aggregating receiver information for each multicast source system into a respective record; aggregating the plurality of respective records into a single message; and multicasting the single message to a group address.

In accordance with other aspects of this exemplary embodiment of the present invention, the method may further include the step of indexing each respective record using an address associated with each multicast source system; wherein the address is an IP address of each multicast source system; wherein receiver information comprises a source identifier, a multicast group, and a group record; wherein the group record comprises one of Transmit and Hold; further comprising the steps of accessing a corresponding respective record from the single message; and enabling each multicast source system to respond based upon the receiver information in each corresponding respective record; and wherein the method operates according to a multicast source notification of interest protocol.

In accordance with another aspect of this exemplary embodiment of the present invention, a computer signal embodied in a carrier wave readable by a computing system and encoding a computer program of instructions for executing a computer process performs the method recited above.

In another exemplary embodiment of the present invention, a system for multicasting a plurality of receiver membership reports containing receiver information comprises a plurality of multicast source systems for receiving receiver information; and a router for collecting receiver information for the plurality of multicast source systems; aggregating receiver information for each multicast source system into a respective record; aggregating the plurality of respective records into a single message; and multicasting the single message to a group address.

In accordance with other aspects of this exemplary embodiment of the present invention, the router indexes each respective record using an address associated with each multicast source system; wherein the address is an IP address of each multicast source system; wherein receiver information comprises a source identifier, a multicast group, and a group record; wherein each multicast source system accesses a corresponding respective record from the single message and responds based upon the receiver information in each corresponding respective record; and wherein multicasting the plurality of receiver membership reports operates according to a multicast source notification of interest protocol.

In another exemplary embodiment of the present invention, an article of manufacture for multicasting a plurality of receiver membership reports containing receiver information for a plurality of multicast source systems, comprises at least one processor readable carrier; and instructions carried on the at least one carrier; wherein the instructions are configured to be readable from the at least one carrier by at least one processor and thereby cause the at least one processor to operate so as to: collect receiver information for the plurality of multicast source systems; aggregate receiver information for each multicast source system into a respective record; aggregate the plurality of respective records into a single message; and multicast the single message to a group address.

In accordance with other aspects of this exemplary embodiment of the present invention, the at least one processor is further caused to operate so as to index each respective record using an address associated with each multicast source system; wherein the address is an IP address of each multicast source system; wherein receiver information comprises a source identifier, a multicast group, and a group record; wherein the at least one processor is further caused to operate so as to access a corresponding respective record from the single message; and enable each multicast source system to respond based upon the receiver information in each corresponding respective record.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention improves currently available solutions for distributing receiver membership reports by improving the efficiency of first hop network usage. A method of the present invention involves multicasting receiver information to a plurality of multicast source systems. In particular, the method of the present invention involves combining a plurality of unicast messages, aggregating the messages into a single message, and multicasting the single message to an ALLSYSTEMS address. All the multicast source systems will receive the single message, thereby allowing each system to retrieve information that the system is interested in receiving.

Figure 1:
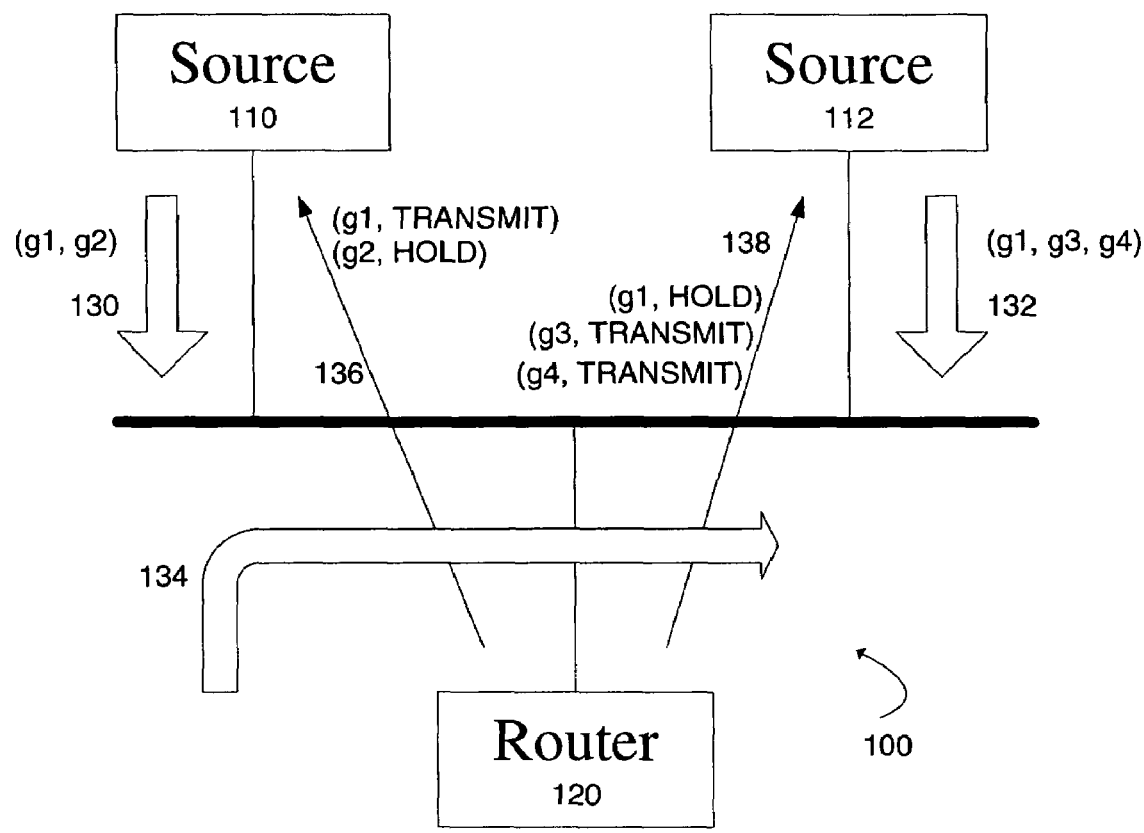
FIG. 1 is a system for multicasting receiver information in accordance with the present invention.

FIG. 1 illustrates a system 100 for multicasting receiver information in accordance with the present invention. In FIG. 1, a multicast source system, such as source 110, is sending multicast traffic to multicast groups g1 and g2, as shown by 130. A multicast source system, such as source 112, is sending multicast traffic to multicast groups g1, g3, and g4, as shown by 132. Both sources 110 and 112 are interested in receiving receiver information for their traffic.

In current systems implementing MSNIP, a Router 120 maintains receiver information for sources 110 and 112 through a multicast routing protocol. Router 120 retrieves receiver information for source 110. In this example, there are receivers for g1 and no more receivers for g2. In MSNIP, Router 120 may unicast this information to source 110 using a format, such as (g1, TRANSMIT), (g2, HOLD). A TRANSMIT record instructs a multicast source system to start sending traffic, while a HOLD record instructs a multicast source system to stop sending traffic. Once source 110 receives the message, source 110 will continue to send traffic to group address g1 and stop sending traffic to group address g2. Router 120 may also unicast the receiver information (g1, HOLD), (g3, TRANSMIT), (g4, TRANSMIT) to source 112 and source 112 will act accordingly once receiving the message. In particular, source 112 will stop sending traffic to group address g1 and continue to send traffic to group address g3 and g4.

According to an algorithm of the present invention, a router 120 collects receiver information for both sources 110 and 112. Router 120 aggregates the receiver information for source 110 into a first record and indexes the first record using an IP address of source 110 in a format, such as {s1, (g1, TRANSMIT), (g2, HOLD)} where s1 represents source 110. Router 120 also aggregates receiver information for source 112 into a second record and indexes the second record using an IP address of source 112 in a format, such as {s2, (g1, HOLD), (g3, TRANSMIT), (g4, TRANSMIT)} where s2 represents source 112. Router 120 may aggregate the first record and second record into a single message, as shown by 134. Router 120 may send the single message to a group address, such as an ALLSYSTEMS group address. Once receiving the single message, source 110 and source 112 may retrieve the information each source is interested in receiving and may respond accordingly. In particular, source 110 may retrieve information regarding group g1 and g2, as represented by 136. Source 112 may retrieve information regarding g1, g3 and g4, as represented by 138.

Figure 2:
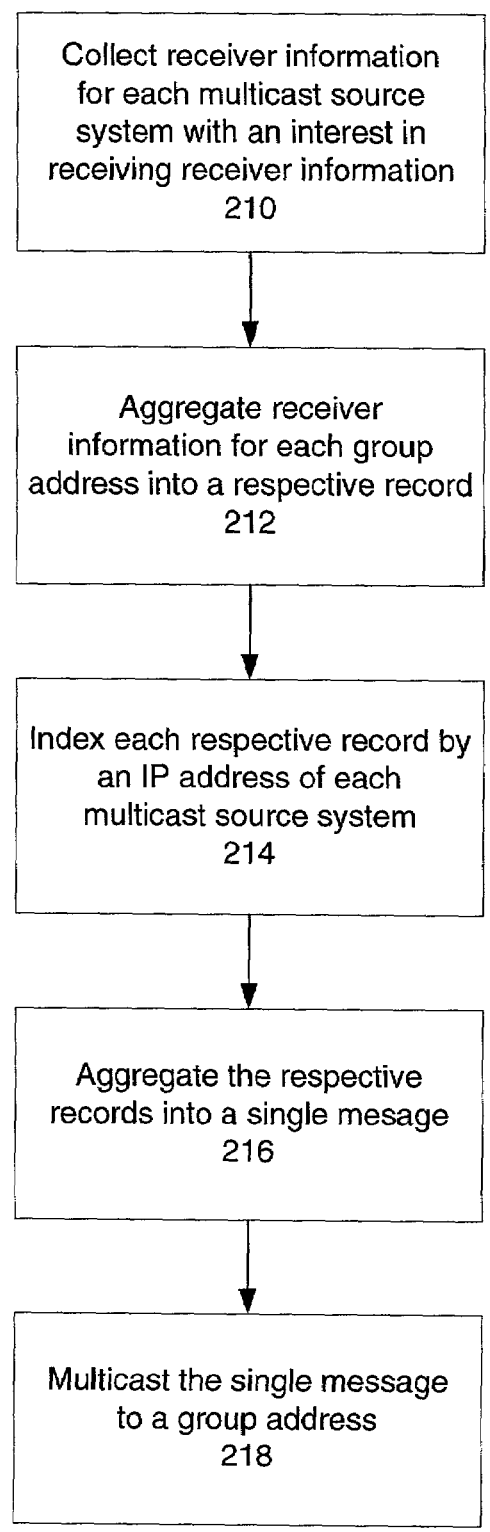
FIG. 2 is a flowchart of an algorithm for multicasting receiver information in accordance with the present invention.

FIG. 2 illustrates an algorithm for multicasting receiver information, according to the present invention. At step 210, receiver information is collected for each multicast source system that has solicited an interest in receiving the receiver information. At step 212, for each multicast source system, the receiver information is aggregated for each group address into a respective record. At step 214, each respective record is indexed by an IP address of each multicast source system. At step 216, the respective records are aggregated into a single message. At step 218, the single message is multicasted to a group address, such as an ALLSYSTEMS group address.

At this point it should be noted that multicasting receiver membership reports in accordance with the present invention as described above typically involves the processing of input data and the generation of output data to some extent. This input data processing and output data generation may be implemented in hardware or software. For example, specific electronic components may be employed in a router or similar or related circuitry for implementing the functions associated with multicasting receiver membership reports in accordance with the present invention as described above. Alternatively, one or more processors operating in accordance with stored instructions may implement the functions associated multicasting receiver membership reports in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for multicasting a plurality of receiver membership reports containing receiver information for a plurality of multicast source systems, the method comprising the steps of:
   collecting receiver information for the plurality of multicast source systems;
   aggregating the receiver information for each multicast source system into a respective record;
   indexing each respective record using an address associated with each multicast source system;
   aggregating the plurality of respective records into a single message; and
   multicasting the single message to a group address, wherein the group address includes each multicast source system so that each of the plurality of multicast source systems receives the single message.

2. The method of claim 1, wherein the address associated with each multicast source system is an IP address of each multicast source system.

3. The method of claim 1, wherein the receiver information comprises a source identifier, a multicast group, and a group record.

4. The method of claim 3, wherein the group record comprises one of Transmit and Hold.

5. The method of claim 1, further comprising the steps of:
   accessing a corresponding respective record from the single message; and
   enabling each multicast source system to respond based upon the receiver information in each corresponding respective record.

6. The method of claim 1, wherein the method operates according to a multicast source notification of interest protocol.

7. A system for multicasting a plurality of receiver membership reports containing receiver information, the system comprising:
   a plurality of multicast source systems for receiving receiver information; and
   a router for collecting receiver information for the plurality of multicast source systems; aggregating the receiver information for each multicast source system into a respective record; indexing each respective record using an address associated with each multicast source system; aggregating the plurality of respective records into a single message; and multicasting the single message to a group address, wherein the group address includes each multicast source system so that each of the plurality of multicast source systems receives the single message.

8. The system of claim 7, wherein the address associated with each multicast source system is an IP address of each multicast source system.

9. The system of claim 7, wherein the receiver information comprises a source identifier, a multicast group, and a group record.

10. The system of claim 7, wherein each multicast source system accesses a corresponding respective record from the single message and responds based upon the receiver information in each corresponding respective record.

11. The system of claim 7, wherein multicasting the plurality of receiver membership reports operates according to a multicast source notification of interest protocol.

12. An article of manufacture for multicasting a plurality of receiver membership reports containing receiver information for a plurality of multicast source systems, the article of manufacture comprising:
   at least one computer-processor-readable storage medium; and instructions stored on the at least one medium;
   wherein the instructions are configured to be readable from the at least one medium by at least one processor and thereby cause the at least one processor to operate so as to:
   collect receiver information for the plurality of multicast source systems;
   aggregate the receiver information for each multicast source system into a respective record;
   index each respective record using an address associated with each multicast source system;
   aggregate the plurality of respective records into a single message; and
   multicast the single message to a group address, wherein the group address includes each multicast source system so that each of the plurality of multicast source systems receives the single message.

13. The article of manufacture of claim 12, wherein the address associated with each multicast source system is an IP address of each multicast source system.

14. The article of manufacture of claim 12, wherein the receiver information comprises a source identifier, a multicast group, and a group record.

15. The article of manufacture of claim 12, wherein the at least one processor is further caused to operate so as to:
   access a corresponding respective record from the single message; and
   enable each multicast source system to respond based upon the receiver information in each corresponding respective record.

16. The article of manufacture of claim 12, wherein the article of manufacture operates according to a multicast source notification of interest protocol.

* * * * *